(12) United States Patent
Qian (10) Patent No.: US 9,408,018 B2
(45) Date of Patent: Aug. 2, 2016

(54) DUAL WIRELESS MODE SPEAKER AND CONTROL METHOD THEREOF

(71) Applicant: LinkSens Technology Inc., Jiangsu (CN)

(72) Inventor: Dahong Qian, Jiangsu (CN)

(73) Assignee: LINKSENS TECHNOLOGY INC., Jiangsu (CN)

( * ) Notice: Subject to any disclaimer, the term of this patent is extended or adjusted under 35 U.S.C. 154(b) by 113 days.

(21) Appl. No.: 14/315,279

(22) Filed: Jun. 25, 2014

(65) Prior Publication Data

US 2015/0003630 A1    Jan. 1, 2015

(30) Foreign Application Priority Data

Jun. 26, 2013    (CN) .......................... 2013 1 0279430

(51) Int. Cl.
*H04W 4/00*    (2009.01)
*H04R 3/00*    (2006.01)

(52) U.S. Cl.
CPC ................. *H04W 4/008* (2013.01); *H04R 3/00* (2013.01); *H04R 2420/07* (2013.01); *H04R 2420/09* (2013.01)

(58) Field of Classification Search
USPC .................. 455/41.1–41.3, 412.1, 550.1, 566
See application file for complete search history.

(56) References Cited

U.S. PATENT DOCUMENTS

2003/0097659 A1*  5/2003  Goldman .......... H04L 29/06027
                                                          725/89
2013/0217450 A1*  8/2013  Kanj .................... H01Q 1/242
                                                          455/575.7

* cited by examiner

*Primary Examiner* — Md S Elahee
(74) *Attorney, Agent, or Firm* — Blakely Sokoloff Taylor & Zafman LLP (57) ABSTRACT

A dual-wireless mode speaker is disclosed, which includes a controller and a wireless receiver module connected to the controller. The wireless receiver module includes a Bluetooth receiver module and a WiFi receiver module. The speaker further includes an audio processing module with an input terminal coupled to the controller and an audio output module coupled to an output terminal of the audio processing module. The speaker is configured to operate in one of a Bluetooth-only mode, a WiFi-only mode and a dual-wireless mode. Additionally, the Bluetooth receiver module is activated and the WiFi receiver module is deactivated in the Bluetooth-only mode; the Bluetooth receiver module is deactivated and the WiFi receiver module is activated in the WiFi-only mode; and both the Bluetooth receiver module and the WiFi receiver module are activated in the dual-wireless mode.

6 Claims, 5 Drawing Sheets

DUAL WIRELESS MODE SPEAKER AND CONTROL METHOD THEREOF

CROSS-REFERENCES TO RELATED APPLICATIONS

This application claims the priority of Chinese patent application number 201310279430.7, filed on Jun. 26, 2013, the entire contents of which are incorporated herein by reference.

TECHNICAL FIELD

The present invention relates generally to a wireless speaker, and more particularly, to a dual wireless mode speaker. The present invention also relates to a control method of the speaker.

BACKGROUND

The concept of wireless speakers has existed for many years, however, due to less demands, this market sector is still embryonic, just like the case of tablet PCs. Nevertheless, with the rapid expansion of market shares of laptops, smart phones and tablet PCs in recent years, users' demand for enjoying high quality music anywhere without locational constraints is showing an increasing trend.

Currently, the wireless speaker market is primarily dominated by Bluetooth and WiFi products. The Bluetooth sector is more developed and there are many brands therein, including both foreign and domestic ones. On the other hand, the existing brands participating in the WiFi sector mainly include Air Play of Apple Inc. and several brands of Sony Corporation.

Between the aforementioned two wireless audio solutions, Bluetooth is undoubtedly more universal and has a longer history, from its earliest application in an earphone for Ericsson mobile phones. A predominant advantage of Bluetooth over WiFi is its low power consumption property—the mainstream Bluetooth 2.1 version is embedded with a feature called "Sniff Subrating" which allows distance-dependent transmission power adjustment for power consumption reduction. In addition, Bluetooth is also excellent in interference immunity and point-to-point communication security. Despite these advantages, Bluetooth does, however, suffer from some limitations, one of which is its insufficient data transfer rate (DTR). DTR of the earliest Bluetooth 1.x version was only about 748-810 Kbps, with which audio data had to be transmitted in a compressed form and the obtained acoustic quality rendered the technology only suitable for the application of voice communications rather than music playing due to significant acoustic distortion. Although the DTR has been greatly increased to about 1.8-2.1 Mbps in the current mainstream Bluetooth 2.1 version, it is still insufficient for lossless transmission of high-quality stereo data. Another limitation of Bluetooth is just its point-to-point nature, which, on one hand, makes the technology unable to establish a multi-room audio system as conveniently as the point-to-multipoint WiFi solution, and on the other hand, adds difficulty by requiring ever-successfully paired players to be re-paired for any new connection. Furthermore, although Bluetooth modules adopting the most popular Class B format generally has a nominal working distance of 8-30 meters, their actual effective distance (open space) is only about 10 meters, which is insufficient, in particular, for home use and the establishment of a multi-room audio system.

WiFi is the abbreviation of "wireless fidelity", and its part "Fi" shares the same meaning with that of Hi-Fi (high-fidelity). While WiFi is inferior to Bluetooth both in communication privacy and interference immunity, it has better performance in terms of speed and networking. Taking the existing mainstream 802.11g and 802.11n standards as examples, their DTR's are 54 Mbps and 300 Mbps respectively, both far beyond the needed bandwidth for creating an acoustic quality that can be obtained by a CD player, and the excessive part can further support users' simultaneous activities, such as video contents transmission and webpage browsing. Moreover, in addition to paired connection between individual devices, WiFi further is capable of, as its most crucial advantage, wireless router-based networking. With this advantage of WiFi, an iPad connected to all speakers in a network by Airplay can accomplish the following mission that is impossible to be fulfilled by a Bluetooth counterpart: broadcasting audio to all the speakers, or only to certain ones of interest, and simultaneously allowing webpage browsing and other user activities. Such networking scheme is more popular abroad. For example, Sonos, who entered the China market last year, is one of the famous providers in the U.S. for WiFi audio solutions. While the domestic market for wireless multi-room audio systems is currently still in its infancy, we have observed increasing acceptance among high-end users.

As noted above, Bluetooth and WiFi both have their strengths and weaknesses. However, as they belong to different branches of the wireless technology, current efforts for their improvement are being exerted based on a technical bias that they should be developed separately along their own tracks. As a result of the efforts, we have found by searching several wireless speakers related technologies disclosed in recent years.

Figure 1:
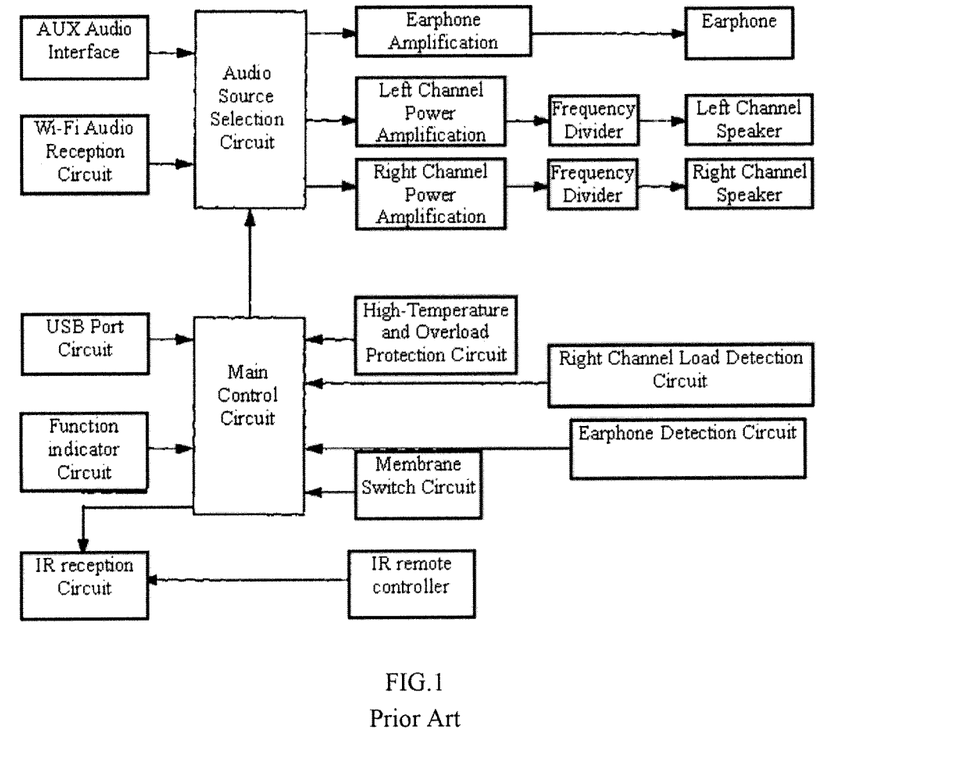
FIG. 1 is a schematic illustration of a conventional WiFi speaker.

Referring to FIG. 1, Chinese Pat. Pub. No. CN102427570A discloses a wireless speaker with IR remote control functionality, as well as high-temperature and overload protection for its main control circuit. However, a problem with this speaker is that it is not suitable for use in wireless-free environments.

Figure 2:
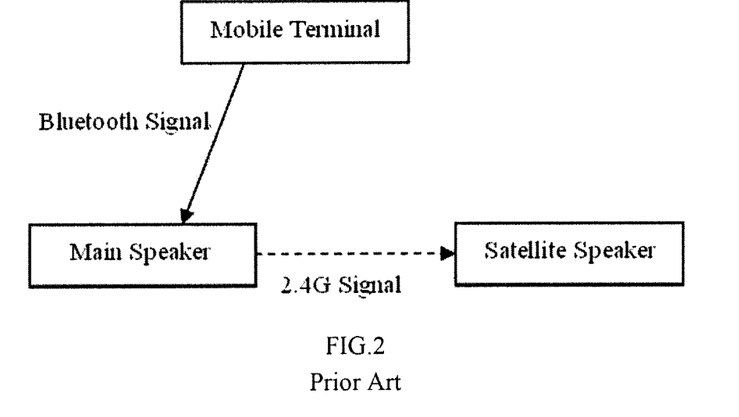
FIG. 2 is a schematic illustration of a conventional Bluetooth speaker.
Figure 3:
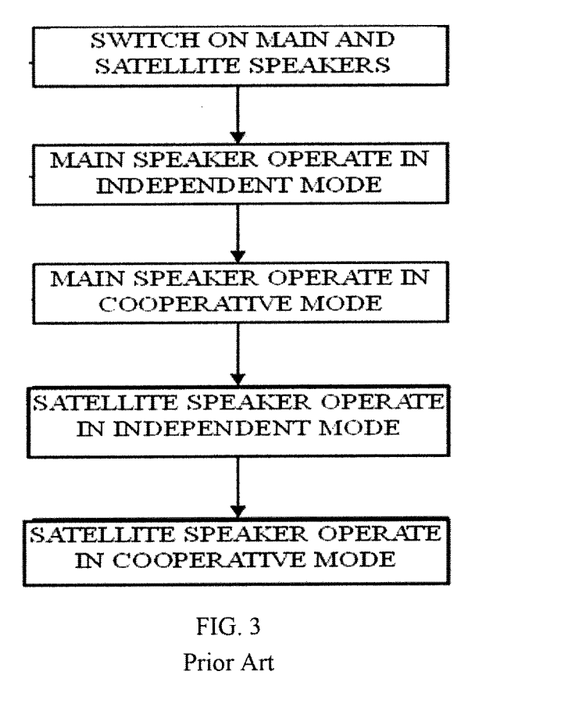
FIG. 3 is a flowchart illustrating a control method of the conventional Bluetooth speaker of FIG. 2.

FIGS. 2-3 show a Bluetooth speaker system disclosed in Chinese Pat. Pub. No. CN102724609A, which achieves the combined use of multiple Bluetooth speakers. However, this system still has several disadvantages, such as for example, 1) it has to adopt a complicated control method for Bluetooth-based communications; and 2) it can only support a maximum number of only one satellite speaker.

Figure 4:
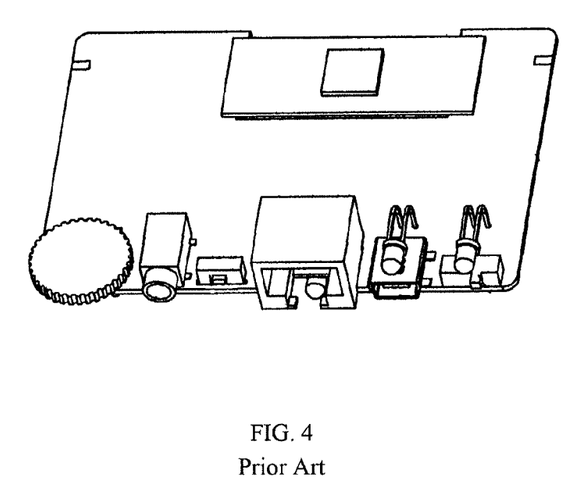
FIG. 4 is a schematic illustration of a conventional multi-functional wireless speaker.

Further, Chinese Pat. Pub. No. CN201995106U discloses a wireless speaker, as shown in FIG. 4, which is capable of establishing a wireless network by bringing together the functions of a WiFi speaker and a wireless access point (AP). This is a solution commonly employed in many products on the market. However, as the speaker just simply combines the roles of a WiFi router and a Bluetooth speaker into a single device and switches between the roles via a switch, it is unable to provide multiple operating modes.

It would therefore be advantageous to have a more ergonomic wireless speaker that has multiple functions and options to meet users' increasing requirements.

SUMMARY OF THE INVENTION

The present invention aims at curing the drawbacks mentioned above, by providing a dual wireless mode speaker which incorporates two wireless communication modules and is thus capable of operating in multiple wireless modes, in which a dual-wireless mode can be controlled in multiple ways. To this end, the present invention also aims to provide a control method for the speaker.

For this purpose, in a first aspect, the invention provides a dual-wireless mode speaker, including: a controller; a wireless receiver module coupled to the controller, the wireless receiver module including a Bluetooth receiver module and a WiFi receiver module; an audio processing module with an input terminal coupled to the controller; and an audio output module coupled to an output terminal of the audio processing module, wherein the speaker is configured to operate in one of a Bluetooth-only mode, a WiFi-only mode and a dual-wireless mode, and wherein the Bluetooth receiver module is activated and the WiFi receiver module is deactivated in the Bluetooth-only mode; the Bluetooth receiver module is deactivated and the WiFi receiver module is activated in the WiFi-only mode; and both the Bluetooth receiver module and the WiFi receiver module are activated in the dual-wireless mode.

Preferably, the speaker may further include: an AUX audio interface; and an audio selection module having a first input terminal, a second input terminal and an output terminal. Additionally, each of the AUX audio interface, the Bluetooth receiver module and the WiFi receiver module is coupled to the first input terminal of the audio selection module, wherein the second input terminal of the audio selection module is coupled to the controller. Further, the output terminal of the audio selection module is coupled to the input terminal of the audio processing module.

Preferably, the audio processing module may include an audio amplification module, and the audio output module may include an earphone and/or a speaker unit.

Alternatively and also preferably, the audio output module may include two or more speaker units, and the audio processing module may further include a frequency divider which has an input terminal coupled to an output terminal of the audio amplification module and an output terminal coupled to each of the two or more speaker units.

Preferably, the speaker may further include: one or more of a push button, a display device, an LED, a memory device, an infrared receiver module and a USB port, each connected to the controller.

In a second aspect, the invention provides a control method for a dual-wireless mode speaker, including the steps of: a) turning on the speaker; b) setting a wireless mode of the speaker, wherein the wireless mode is one of a Bluetooth-only mode, a WiFi-only mode and a dual-wireless mode; c) identifying the set wireless mode of the speaker, and: deactivating the WiFi receiver module and activating the Bluetooth receiver module to make the speaker operate in the Bluetooth-only mode if the set wireless mode is identified as the Bluetooth-only mode, or deactivating the Bluetooth receiver module and activating the WiFi receiver module to make the speaker operate in the WiFi-only mode if the set wireless mode is identified as the WiFi-only mode, or activating both the WiFi receiver module and the Bluetooth receiver module and making the speaker operate in the dual-wireless mode if the set wireless mode is identified as the dual-wireless mode; and d) returning to step b).

Preferably, the setting in step b) may be accomplished at a wireless transmitter by means of software.

Preferably, the setting in step b) may also be accomplished at a wireless receiver by means of a push button provided on the speaker or infrared remote control.

Preferably, making the speaker operate in the dual-wireless mode in step c) may include the steps of: c11) establishing Bluetooth and WiFi connections; c12) playing an audio and conducting voice communications via the Bluetooth connection; and c13) accessing a network, downloading audio data therefrom and storing the audio data via the WiFi connection.

Preferably, storing the audio data in step c13) may include storing the audio data on an internal memory device of the speaker, or on an external memory device connected to the speaker via a USB port.

Preferably, making the speaker operate in the dual-wireless mode in step c) may include the steps of: c21) establishing Bluetooth and WiFi connections; c22) conducting voice communications via the Bluetooth connection; and c23) playing an audio via the WiFi connection.

Preferably, making the speaker operate in the dual-wireless mode in step c) may include the steps of: c31) establishing Bluetooth and WiFi connections; c32) identifying whether there is a wireless audio to be played, and proceeding to step c33) if yes, or to c34) if no; c33) identifying whether the Bluetooth connection or the WiFi connection to be selected to transfer the wireless audio, receiving the audio by the Bluetooth receiver module if the former is selected, or by the WiFi receiver module if the WiFi connection is selected, and displaying the transferred wireless audio; c34) identifying whether it is needed to handle a phone call, and returning to step c32) if no, or pausing the display of the transferred wireless audio and proceeding to step c35) if yes; c35) determining whether the speaker is to be used to handle the phone call, and proceeding to step c36) if no, or if yes, further determining whether the Bluetooth connection or the WiFi connection to be selected to handle the phone call, and handling the phone call with the Bluetooth connection if the Bluetooth connection is selected, or handling the phone call with the WiFi connection if the WiFi connection is selected; and c36) identifying whether the phone call is completed, if yes further identifying whether there is paused wireless audio prior to the phone call, and returning to step c32) if there isn't, or resume the paused wireless audio and returning to step c34) if there is.

Advantageously, incorporation of two wireless communication modules allows the dual wireless module speaker of the invention to operate in multiple wireless modes. Moreover, the control method further enables the speaker to operate, when in the dual-wireless mode, in multiple ways.

BRIEF DESCRIPTION OF THE DRAWINGS

The following detailed description of the illustrative embodiments can be understood when read in conjunction with the following drawings, in which.

DETAILED DESCRIPTION

The dual-wireless mode speaker and its control methods of the present invention will be described in greater detail in the following description which demonstrates preferred embodiments of the invention, taken in conjunction with the accompanying drawings. Those of skill in the art should, in light of the present disclosure, appreciate that many changes can be made in the specific embodiments disclosed herein and still obtain the same beneficial results. Therefore, the following description should be construed as the illustrative of the principles of the present invention, and not providing limitations thereto.

Embodiment 1

Figure 5:
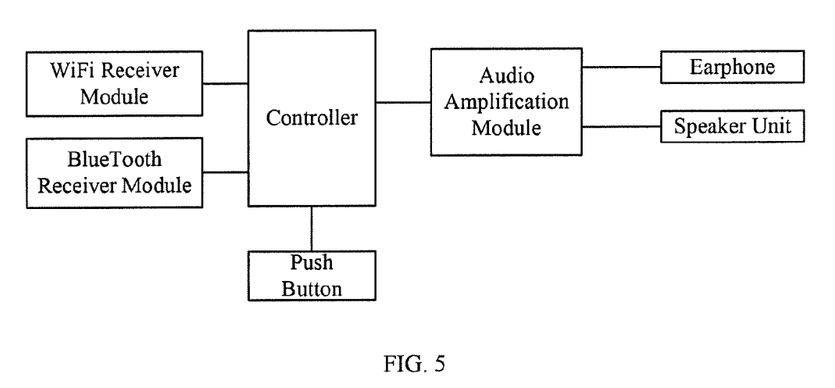
FIG. 5 schematically illustrates a dual wireless mode speaker constructed in accordance with one embodiment of the present invention.

FIG. 5 schematically illustrates a dual-wireless mode speaker constructed in accordance with this embodiment of the present invention. The speaker includes: a controller; a Bluetooth receiver module and a WiFi receiver module (i.e., two wireless receiver modules), each connected to the controller; an audio amplification module (i.e., audio processing module) also connected to the controller; and an earphone and a speaker unit (i.e., audio output module), each connected to an output terminal of the audio amplification module. Optionally, a push button may be connected to the controller for inputting control commands, for example, to activate or deactivate the Bluetooth receiver module and/or the WiFi receiver module through the controller.

Embodiment 2

Figure 6:
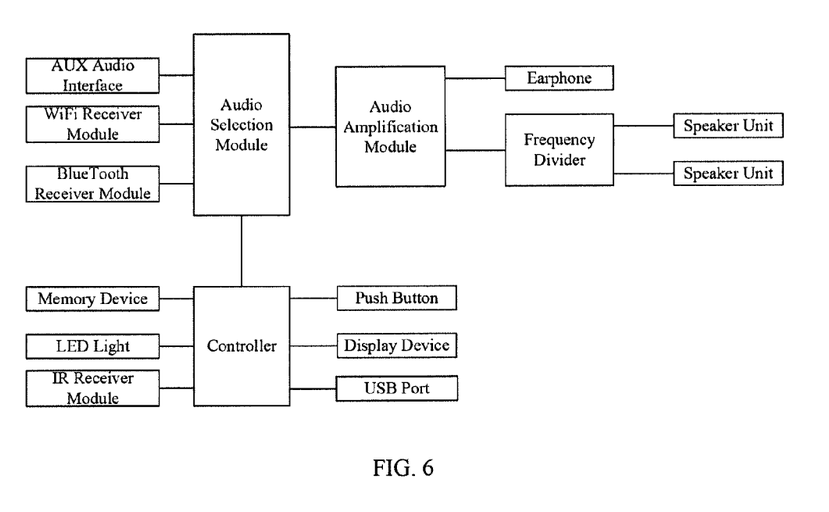
FIG. 6 schematically illustrates a dual-wireless mode speaker constructed in accordance with another embodiment of the present invention.

FIG. 6 shows a dual wireless mode speaker in accordance with this embodiment of the present invention. Compared to the speaker of Embodiment 1, the speaker of this embodiment further includes an AUX audio interface, which, jointly with the Bluetooth and WiFi receiver modules, is coupled to an audio selection module. The audio selection module is connected to the controller and has an output terminal coupled to the audio amplification module (i.e., audio processing module). Similarly, an earphone and a speaker unit (i.e., audio output module), are both connected to an output terminal of the audio amplification module.

The speaker of this embodiment is capable of playing audio selected by the audio selection module from one of the following sources: 1) audio (e.g., music) transferred wirelessly by Bluetooth; 2) audio transferred wirelessly by WiFi (including high-quality audio and music from mobile phones or the Internet); and 3) audio transferred in a wired manner through the AUX audio interface.

Embodiment 3

Preferably, in this embodiment, the dual-wireless mode speaker of the invention includes two or more speaker units, and the audio processing module further includes a frequency divider connected downstream to the audio amplification module. In addition, an output terminal of the frequency divider is connected to each of the speaker units (two of the speaker units are shown in FIG. 6). This arrangement can provide the speaker with an ability to create a dual sound channel or multi-channel surround sound effect.

Embodiment 4

Preferably, in this embodiment, the dual-wireless mode speaker of the invention further includes one or more of a push button, a display device, an LED, a memory device, an infrared (IR) receiver module and a USB port, each connected to the controller.

These features can impart to the speaker the following abilities: 1) setting of the speaker by the push button; 2) displaying of information of contents being reproduced, information about the network, lyrics, etc. on the display device; 3) decoration and illumination in night by the LED; 4) control and setting of the speaker by the IR receiver module when used in combination with an suitable IR remote controller; and 5) external memory extension via the USB port for directly playing audio stored on the external memory or for storing audio data download by WiFi on the external memory. Note that in practical applications, the speaker may include all of these features or only part of these features.

Embodiment 5

Figure 7:
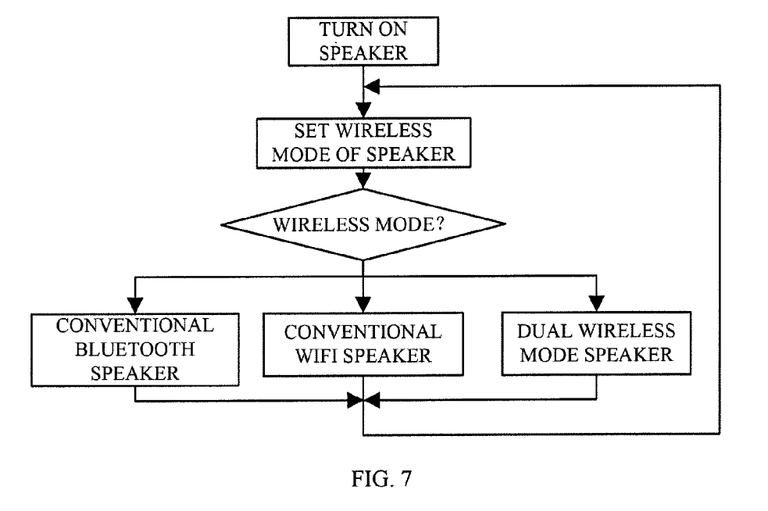
FIG. 7 depicts a flowchart graphically illustrating a control method for a dual wireless mode speaker in accordance with one embodiment of the invention.

FIG. 7 shows a control method for a dual-wireless mode speaker in accordance with this embodiment of the invention. As illustrated, the control method includes the steps of:

1) turning on the speaker;

2) setting a wireless mode of the speaker, wherein the wireless mode is one of a Bluetooth-only mode, a WiFi-only mode and a dual-wireless mode;

3) identifying the set wireless mode of the speaker, and: deactivating the WiFi receiver module and activating the Bluetooth receiver module to make the speaker operate in the Bluetooth-only mode if the set wireless mode is identified as the Bluetooth-only mode, or deactivating the Bluetooth receiver module and activating the WiFi receiver module to make the speaker operate in the WiFi-only mode if the set wireless mode is identified as the WiFi-only mode, or activating both the WiFi receiver module and the Bluetooth receiver module and making the speaker operate in the dual-wireless mode if the set wireless mode is identified as the dual-wireless mode; and 4) returning to step 2).

As a variant, the setting in step 2) may be accomplished at a wireless transmitter by software (i.e., an associated application installed on a mobile phone, a laptop, or a tablet PC, which is capable of wireless communications).

As another variant, the setting in step 2) may be accomplished at a wireless receiver by means of a push button provided on the speaker or IR remote control.

In step 3), when the speaker of the invention operates in the Bluetooth-only or in WiFi-only mode, it functions in the same way as a conventional Bluetooth or WiFi speaker. With this design, a user can select a suitable mode according to a practical condition. Further, in step 3), when the speaker is operating in the dual-wireless mode for audio playing, in the event of an incoming phone call, the user can take corresponding control actions according to different conditions, as specified in the following Table 1.

TABLE 1

| Current wireless mode in which the audio is being played | Action taken upon the incoming phone call | Action taken after the phone call is completed |
|---|---|---|
| Bluetooth | Pause the Bluetooth audio and handle the phone call via a Bluetooth connection | Resume the paused Bluetooth audio |
| | Pause the Bluetooth audio and handle the phone call with an associated mobile phone | Resume the paused Bluetooth audio |
| | Pause the Bluetooth audio and handle the phone call via a WiFi connection | Resume the paused Bluetooth audio |
| WiFi | Pause the WiFi audio and handle the phone call with the WiFi via a WiFi connection | Resume the paused WiFi audio |
| | Pause the WiFi audio and handle the phone call with an associated mobile phone | Resume the paused WiFi audio |
| | Pause the WiFi audio and handle the phone call via a Bluetooth connection | Resume the paused WiFi audio |

Figure 8:
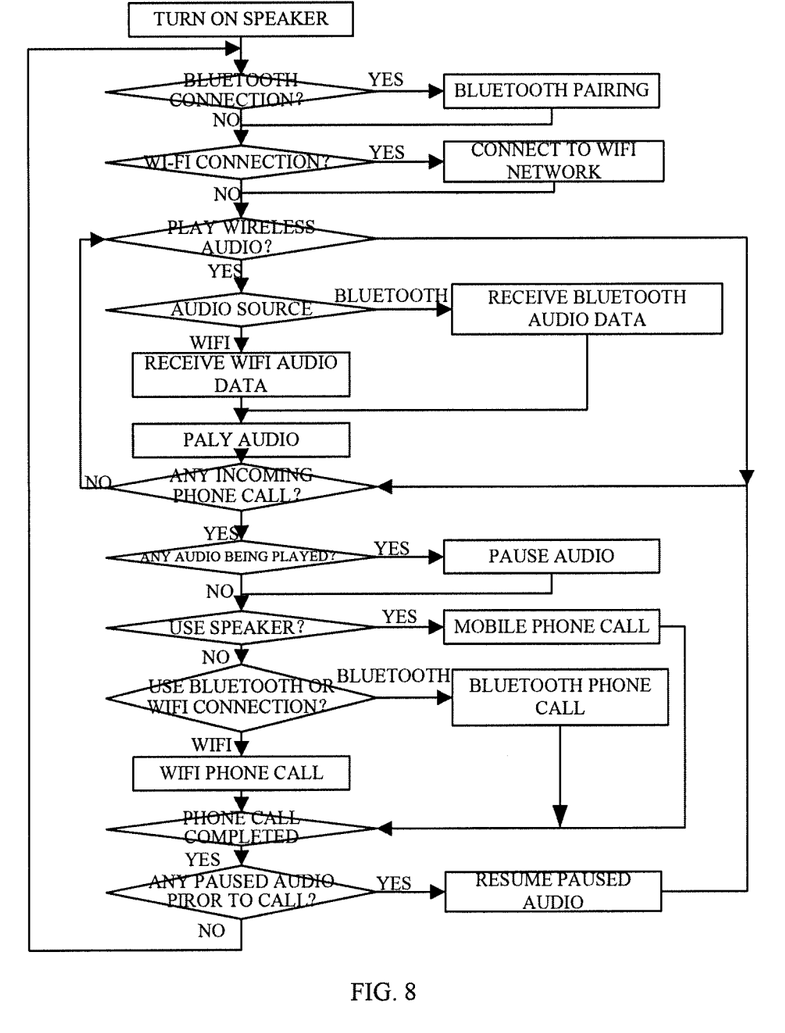
FIG. 8 is a flowchart illustrating a process of making a speaker operate in a dual-wireless mode in the control method of FIG. 7.

FIG. 8 is a flowchart illustrating a process of making the speaker operate in the dual-wireless mode in step 3). As illustrated, the method includes the following steps:

3.11) establishing Bluetooth and WiFi connections;

3.12) identifying whether there is a wireless audio to be played, and proceeding to step 3.13) if yes, or to 3.14) if no;

3.13) identifying whether the Bluetooth connection or the WiFi connection to be selected to transfer the wireless audio, receiving the audio by the Bluetooth receiver module if the Bluetooth receiver module is selected, or by the WiFi receiver module if the WiFi receiver module is selected, and displaying the transferred wireless audio;

3.14) identifying whether it is needed to handle a phone call, and returning to step 3.12) if no, or pausing the display of the transferred wireless audio and proceeding to step 3.15) if yes;

3.15) determining whether the speaker is to be used to handle the phone call, and proceeding to step 3.16) if no, or if yes, further determining whether the Bluetooth connection or the WiFi connection to be selected to handle the phone call, and handling the phone call with the Bluetooth connection if the Bluetooth connection is selected, or handling the phone call with the WiFi connection if the WiFi connection is selected; and 3.16) identifying whether the phone call is completed, if yes further identifying whether there is paused wireless audio prior to the phone call, and returning to step 3.12) if there isn't, or resume the paused wireless audio and returning to step 3.14) if there is.

Embodiment 6

In this embodiment, making the speaker operate in the dual-wireless mode in step 3) of the control method of Embodiment 5 includes the following steps:

3.21) establishing Bluetooth and WiFi connections;

3.22) playing an audio and conducting voice communications via the Bluetooth connection; and 3.23) accessing a network, downloading audio data therefrom and storing the audio data via the WiFi connection.

Preferably, storing the audio data in step 3.23) includes storing the audio data on an internal memory device of the speaker, or on an external memory device connected to the speaker via a USB port.

In this way, the user can save time and acquire audio (e.g., music) data more efficiently, by doing the activities of: playing audio and conduction voice communications; and downloading and storing audio data, simultaneously without mutual interruption.

Embodiment 7

In this embodiment, making the speaker operate in the dual-wireless mode in step 3) of the control method of Embodiment 5 includes the following steps:

3.31) establishing Bluetooth and WiFi connections;

3.32) conducting voice communications via the Bluetooth connection; and 3.33) playing an audio via the WiFi connection.

This arrangement allows the speaker to act as a component of a networked speaker system in virtue of the point-to-multipoint nature of the WiFi connection while protecting the privacy of voice communications in virtue of the point-to-point nature of the Bluetooth connection, thereby solving the dilemma of the conventional wireless speaker.

As described herein, by incorporating two wireless communication modules, the speaker of the invention is capable of operating in multiple wireless modes (i.e., the Bluetooth-only, WiFi-only and dual-wireless modes). In addition, the control method of the invention further enables the speaker to operate, when in the dual-wireless mode, in multiple ways to meeting users' more comprehensive requirements.

What is claimed is:

1. A control method for a speaker including a Bluetooth receiver module and a WiFi receiver module, the speaker being external to and used in association with a mobile phone, wherein the control method comprises the steps of:

a) turning on the speaker wherein the speaker includes a plurality of wireless modes comprising a Bluetooth-only mode, a WiFi-only mode and a dual-wireless mode;

b) setting a wireless mode of the speaker, wherein the wireless mode is one of the Bluetooth-only mode, the WiFi-only mode and the dual-wireless mode;

c) identifying the set wireless mode of the speaker, and: deactivating the WiFi receiver module and activating the Bluetooth receiver module to make the speaker operate in the Bluetooth-only mode if the set wireless mode is identified as the Bluetooth-only mode, or deactivating the Bluetooth receiver module and activating the WiFi receiver module to make the speaker operate in the WiFi-only mode if the set wireless mode is identified as the WiFi-only mode, or activating both the WiFi receiver module and the Bluetooth receiver module and making the speaker operate in the dual-wireless mode if the set wireless mode is identified as the dual-wireless mode; and d) returning to step b), wherein making the speaker operate in the dual-wireless mode in step c) includes the steps of:

1) establishing Bluetooth and WiFi connections;

2) identifying whether there is a wireless audio to be played, and proceeding to step 3) if yes, or to 4) if no;

3) identifying whether the Bluetooth connection or the WiFi connection to be selected to transfer the wireless audio, receiving the audio by the Bluetooth receiver module if the Bluetooth connection is selected, or by the WiFi receiver module if the WiFi connection is selected, and displaying the transferred wireless audio;

4) identifying whether it is needed to handle a phone call for the mobile phone, and returning to step 2) if no, or pausing the display of the transferred wireless audio and proceeding to step 5) if yes;

5) determining whether the speaker is to be used to handle the phone call for the mobile phone, and proceeding to step 6) if no, or if yes, further determining whether the Bluetooth connection or the WiFi connection to be selected to handle the phone call, and handling the phone call with the Bluetooth connection if the Bluetooth connection is selected, or handling the phone call with the WiFi connection if the WiFi connection is selected; and 6) identifying whether the phone call is completed, if yes further identifying whether there is paused wireless audio prior to the phone call, and returning to step 2) if there isn't, or resume the paused wireless audio and returning to step 4) if there is.

2. The control method of claim 1, wherein the setting in step b) is accomplished at a wireless transmitter by means of software.

3. The control method of claim 1, wherein the setting in step b) is accomplished at a wireless receiver by means of a push button provided on the speaker or infrared remote control.

4. The control method of claim 1, wherein making the speaker operate in the dual-wireless mode in step c) further includes the steps of:

c11) playing an audio and conducting voice communications via the Bluetooth connection; and c12) accessing a network, downloading audio data therefrom and storing the audio data via the WiFi connection.

5. The control method of claim 4, wherein storing the audio data in step c12) includes storing the audio data on an internal memory device of the speaker, or on an external memory device connected to the speaker via a USB port.

6. The control method of claim 1, wherein making the speaker operate in the dual-wireless mode in step c) further includes the steps of:

c21) conducting voice communications via the Bluetooth connection; and c22) playing an audio via the WiFi connection.

* * * * *